United States Patent [19]

Murray et al.

[11] Patent Number: 5,362,342
[45] Date of Patent: Nov. 8, 1994

[54] METHOD OF BONDING ROOF TILES TO ROOF SUBSTRATE UTILIZING URETHANE FOAM

[75] Inventors: Pat L. Murray, Spring; E. Richard Huber, Houston, both of Tex.; Thomas C. Hughes, Orlando, Fla.

[73] Assignee: Polyfoam Products, Inc., Spring, Tex.

[21] Appl. No.: 56,183

[22] Filed: May 3, 1993

Related U.S. Application Data

[63] Continuation-in-part of Ser. No. 916,525, Jul. 20, 1992, Pat. No. 5,219,097.

[51] Int. Cl.⁵ .................................................. B32B 31/06
[52] U.S. Cl. ............................................ 156/71; 156/77; 156/78; 156/79; 156/575; 156/578
[58] Field of Search .................... 156/71, 77, 78, 79, 156/575, 578

[56] References Cited

U.S. PATENT DOCUMENTS

| | | | |
|---|---|---|---|
| 3,072,582 | 1/1963 | Frost | 260/2.5 |
| 3,122,862 | 3/1964 | Fipye | 156/575 |
| 3,148,104 | 9/1964 | Rapp | 156/575 |
| 3,240,432 | 3/1966 | Boettler | 239/124 |
| 3,263,928 | 8/1966 | Gusmer | 239/123 |
| 3,291,396 | 12/1966 | Walter | 239/412 |
| 3,391,093 | 7/1968 | Frost | 260/2.5 |
| 3,417,923 | 12/1968 | Carlson | 239/112 |
| 3,633,795 | 1/1972 | Brooks | 222/134 |
| 3,687,370 | 8/1972 | Sperry | 239/112 |
| 3,698,972 | 10/1972 | Lenzner | 156/71 |
| 3,786,990 | 1/1974 | Hagfors | 239/112 |
| 3,873,023 | 3/1975 | Moss et al. | 239/3 |
| 3,876,145 | 4/1975 | Gusmer et al. | 239/112 |
| 3,941,355 | 3/1976 | Simpson | 222/145 |
| 3,945,569 | 3/1976 | Sperry | 239/112 |
| 4,023,733 | 5/1977 | Sperry | 239/112 |
| 4,036,673 | 7/1977 | Murphy et al. | 156/79 |
| 4,087,296 | 5/1978 | Hooker | 156/79 |
| 4,105,599 | 8/1978 | Naka et al. | 521/131 |
| 4,205,136 | 5/1980 | Chashi et al. | 521/118 |
| 4,244,901 | 1/1981 | Wenclay | 156/79 |
| 4,262,847 | 4/1981 | Stitzer et al. | 239/112 |
| 4,262,848 | 4/1981 | Chabria | 239/112 |
| 4,263,166 | 4/1981 | Adams | 252/359 E |
| 4,285,446 | 8/1981 | Rapp et al. | 222/70 |
| 4,325,513 | 4/1982 | Smith et al. | 239/112 |
| 4,377,256 | 3/1983 | Commette et al. | 239/117 |
| 4,380,502 | 4/1993 | Müller et al. | 252/182 |

(List continued on next page.)

FOREIGN PATENT DOCUMENTS 926414 5/1963 United Kingdom .
935926 9/1963 United Kingdom .

OTHER PUBLICATIONS

Sealed Air Corp. Brochure, 1982.
Foamtek, Inc. Brochure, "E-Z Froth SF Urethane Foam Dispensing Machine," Aug. 1989, pp. 1-2.
Flexible Products Co. Brochure, "Flexible Products Company," undated, pp. 4, 8-10.

*Primary Examiner*—Caleb Weston
*Attorney, Agent, or Firm*—Pravel, Hewitt, Kimball & Krieger

[57] ABSTRACT

A method of bonding a roof tile to a roof substrate utilizing a two component polyurethane foam. The method includes the step of applying under low pressure a stream of a two component foamable liquid polyurethane on a roof substrate. Preferably, the foamable liquid polyurethane has a density in the range of about one and one-half to about two pounds per cubic foot and a reactivity period in the range of about one and one-half to about four minutes. Preferably, the foamable liquid polyurethane is applied at a rate of about two to about three pounds per minute. The roof tile is placed into contact with the foamable liquid polyurethane during the reactivity period of the foamable liquid polyurethane.

16 Claims, 2 Drawing Sheets

U.S. PATENT DOCUMENTS

| | | | |
|---|---|---|---|
| 4,393,015 | 7/1983 | Kaneda et al. | 264/51 |
| 4,399,930 | 8/1983 | Harding | 222/145 |
| 4,407,982 | 10/1983 | Elgie | 521/122 |
| 4,429,069 | 1/1984 | Williams | 524/469 |
| 4,440,320 | 4/1984 | Wernicke | 222/145 |
| 4,469,251 | 9/1984 | Sperry et al. | 222/135 |
| 4,471,887 | 9/1984 | Decker | 222/145 |
| 4,508,853 | 4/1985 | Kluth et al. | 521/107 |
| 4,534,802 | 8/1985 | Gates et al. | 134/22.12 |
| 4,546,122 | 10/1985 | Radovich et al. | 521/164 |
| 4,568,003 | 2/1986 | Sperry et al. | 222/145 |
| 4,585,807 | 4/1986 | Christman | 521/167 |
| 4,595,711 | 6/1986 | Wood | 521/158 |
| 4,636,425 | 1/1987 | Johnson et al. | 156/78 |
| 4,636,529 | 1/1987 | Crooker | 521/131 |
| 4,642,319 | 2/1987 | McDaniel | 521/175 |
| 4,713,399 | 12/1987 | Webb et al. | 521/110 |
| 4,742,087 | 5/1988 | Kluth et al. | 521/107 |
| 4,742,089 | 5/1988 | Naka et al. | 521/110 |
| 4,913,317 | 4/1990 | Wernicke | 222/1 |
| 4,993,596 | 2/1991 | Brown | 222/145 |
| 5,032,623 | 7/1991 | Keske et al. | 521/131 |
| 5,040,728 | 8/1991 | Zwirlein, Jr. et al. | 239/116 |
| 5,163,584 | 11/1992 | Huber et al. | 222/1 |
| 5,219,097 | 6/1993 | Huber et al. | 222/145 |
| 5,253,461 | 10/1993 | Janoski et al. | 156/71 |

METHOD OF BONDING ROOF TILES TO ROOF SUBSTRATE UTILIZING URETHANE FOAM

This is a continuation-in-part of copending U.S. Pat. application Ser. No. 07/916,525 filed Jul. 20, 1992) U.S. Pat. No. 5,219,097, entitled "APPARATUS FOR MIXING AND DISPENSING A PLURALITY OF COMPONENTS WITH INJECTED LOW PRESSURE GAS." An inventor listed in the present application is a named inventor in application Ser. No. 07/916,525.

FIELD OF THE INVENTION

The present invention relates to a method of bonding roof tiles utilizing polyurethane foam as the bonding medium.

Description of the Prior Art

Roof tiles are widely used as roof coverings on pitched roof decks in various parts of this country as well as in other parts of the world. Roof tiles are extremely durable and provide significant aesthetic and decorative effects to the structures to which they are applied. Roof tiles as described herein may be made of ceramic materials and also brick, stone, concrete, clay, or plastic materials.

Typically, roof tiles have been installed using mortar or similar binders between the roof tile and a roof substrate, such as roofing felt. Using mortar is a slow procedure and labor intensive as the mortar must first be prepared, typically at ground level in buckets which must then be raised to the roof, and then the mortar is applied to the roof substrate. The mortar adds unnecessary weight to the roof. Occasionally, roof tiles are damaged during installation by dropped buckets of mortar. The set-up time of the mortar increases the time required to form the bond between the roof tile and the roof substrate. The installed roof tiles should not be moved until the mortar has set-up as movement of the roof tile affects the bond. Furthermore, the strength of the completed bond between the roof tile and the roof substrate is not extremely satisfactory. Typically, an approximate 60 pound load applied transversely to the roof tile will break the mortar bond between the roof tile and the roof substrate. During high wind loading conditions, such as that experienced during a hurricane or a tornado, the roof tiles frequently release from the roof structure and become life threatening, flying projectiles. The roof tiles are widely strewn about and scattered throughout the area. The flying roof tiles result in additional danger during these devastating events and further increases the tremendous burden of clean-up after these catastrophic events.

It is desirable to have a method of bonding roof tiles to the roof substrate that will provide bonding capacities which are superior to those obtained when using mortar. It is desirable to have a method of bonding which results in a bonding capacity which will withstand anticipated severe storm conditions. Furthermore, it is desirable that the method be a simple operation, non-labor intensive, economical and providing a quick bond between the roof substrate and the roof tile. Furthermore, the bond should withstand the long-term effects of temperature variations experienced by the roof under normal circumstances.

SUMMARY OF THE INVENTION

The present invention is a method of bonding roof tiles to the roof substrate utilizing polyurethane foam as the bonding medium.

The method includes the step of applying under low pressure a stream of a two component foamable liquid polyurethane on a prepared roof substrate. Preferably, the foamable liquid polyurethane has a density in the range of one and one-half to two pounds per cubic foot and a reactivity period in the range of one and one-half to four minutes. Preferably, the foamable liquid polyurethane is applied at a rate in the range of two to three pounds per minute. The roof tile in placed into contact with the foamable liquid polyurethane during the reactivity period of the foamable liquid polyurethane. Remaining roof tiles are installed using the same procedure.

The two component foamable liquid polyurethane is applied with a foam dispensing system. Preferably, the foam dispensing system includes a foam dispensing gun, foam component vessels, a source to provide pressurized gas to the foam dispensing gun, and hoses connecting the various system components. The foam dispensing system is inexpensive, simple and requires little maintenance. The operating pressures of the foam components and the injected pressurized gas in the preferred foam dispensing system are significantly lower than certain prior art foam dispensing systems making the preferred system less costly to operate and maintain.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, in which.

DETAILED DESCRIPTION OF PREFERRED EMBODIMENT

Figure 1:
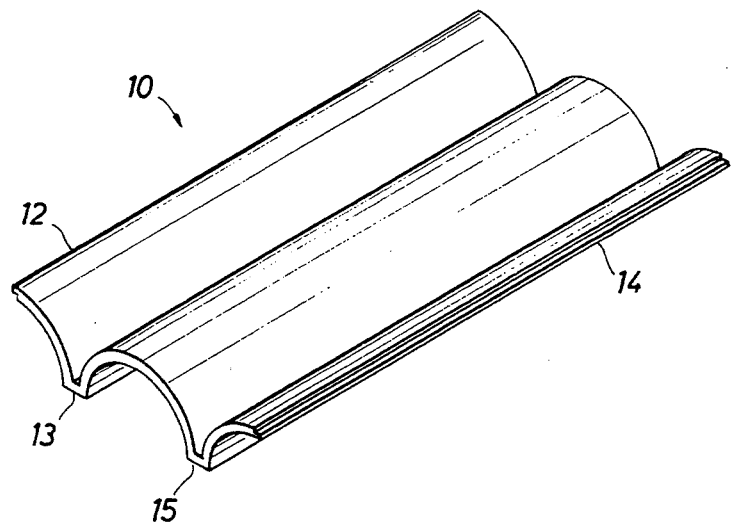
FIG. 1 is a perspective view of a typical roof tile.

Referring to FIG. 1, a roof tile, designated generally as 10, is shown in perspective. The roof tile 10 shown in FIG. 1 is generally known as a semi-circular tile. The method of the present invention will be described with reference to the installation of the roof tile 10 as shown in FIG. 1. It is to be understood that the method of the present invention can also be used with roof tiles of other configurations. For example, the method can also be used with flat roof tiles and reverse curve roof tiles. Typically, the roof tiles 10 are made from ceramic or clay materials. It is to be understood that the method of the present invention is not limited to clay or ceramic roof tiles 10 but is also applicable to roof tiles 10 made from other materials such as brick, stone, concrete and plastic.

Figure 4:
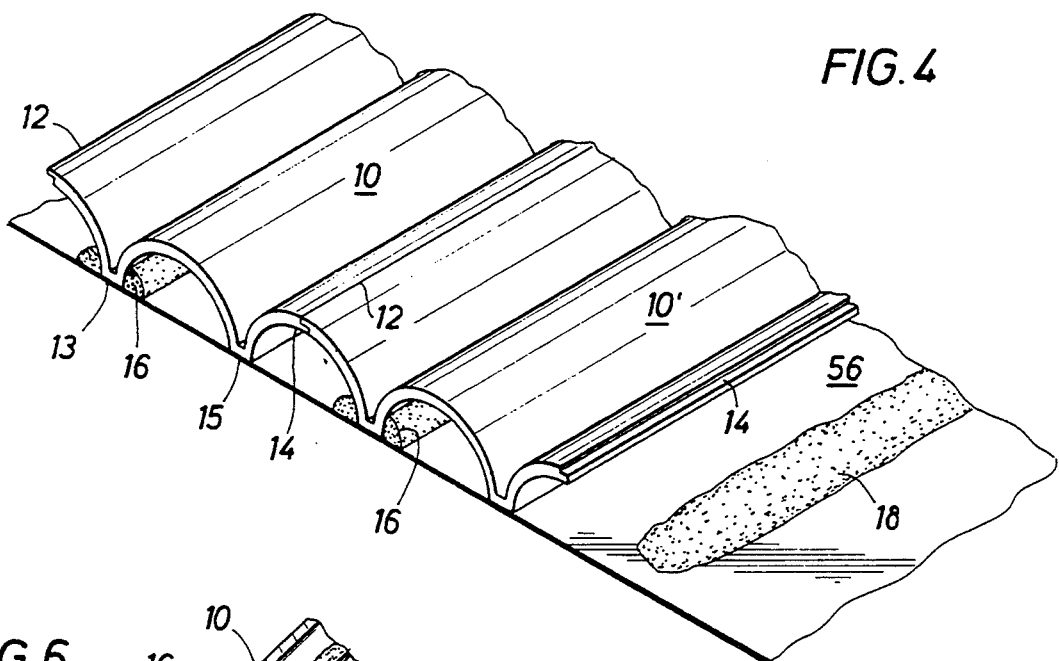
FIG. 4 is a perspective view of a portion of the pitched roof with a lower row of roof tiles being installed.

As shown in FIGS. 1 and 4, the semi-circular roof tile 10 includes an interlocking connection at the first and second longitudinal edges, 12 and 14 respectively, of the roof tile 10. Referring to FIG. 4, the second edge 14 of the first roof tile 10 mates with the first edge 12 of an adjoining second roof tile 10'. This type of interlocking connection for roof tiles 10 is well known in the art. The roof tile 10 as shown in FIG. 1 includes a first base portion 13 and a second base portion 15. The base portions 13 and 15 extend the length of the roof tile 10.

Figure 2:
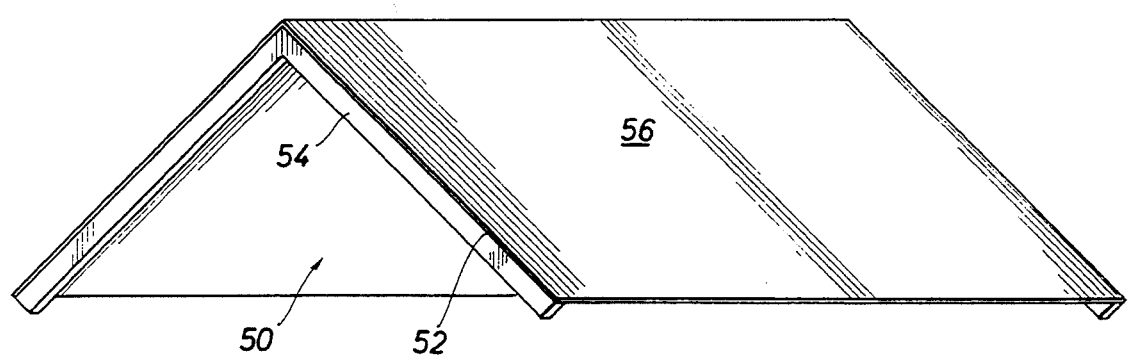
FIG. 2 is a perspective view of a pitched roof deck prior to the installation of the roof tiles.

The roof tiles 10 are installed on a pitched roof deck, designated generally as 50, as shown in FIG. 2. The roof deck 50 typically includes sheets of plywood 52 nailed or glued to roof framing members 54. The roof deck 50 is overlaid with a roof substrate 56 made of a waterproofing material. The waterproofing material forming the roof substrate 56 may be asphalt, tar, or one or more plies of felt attached to the roof deck 50. The felt is typically nailed or cemented to the roof deck 50. Felt is generally made of wood pulp and rag or of asbestos or glass fibers.

Figure 3:
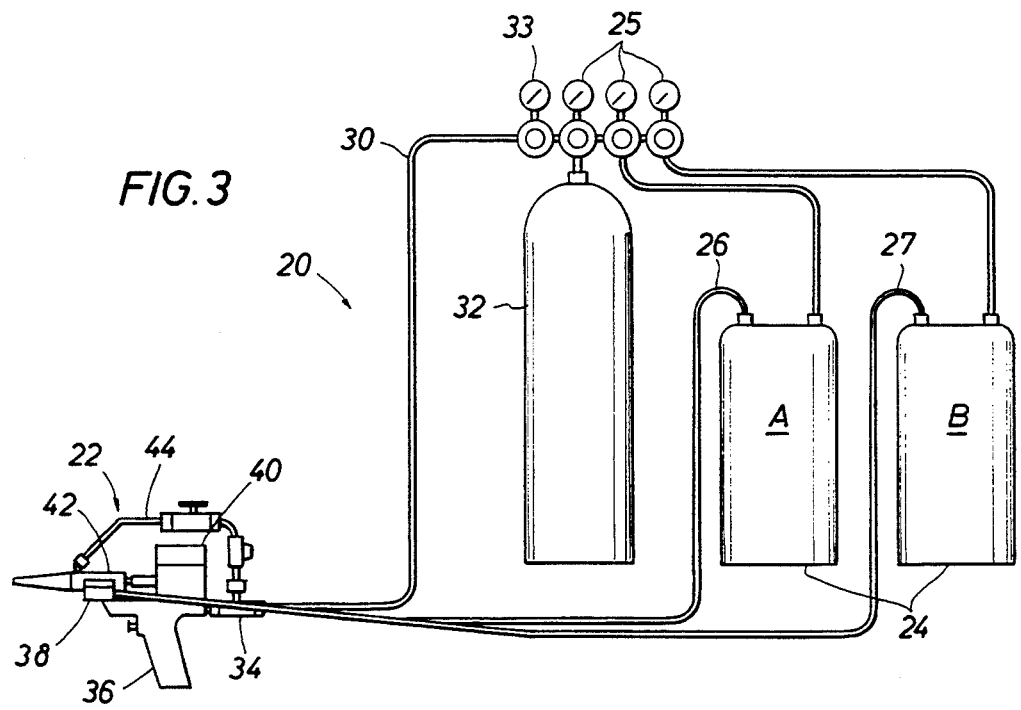
FIG. 3 is a side elevational view of a foam dispensing gun and a foam dispensing system.

The method of the preferred embodiment of the present invention includes the application of a two component foamable liquid polyurethane 16 onto the roof substrate 56 with a foam dispensing system, designated generally as 20, as shown in FIG. 3. Preferably, the two component foamable liquid polyurethane is mixed and dispensed with the foam dispensing gun 22 and the foam dispensing system 20 as described in U.S. Pat. No. 5,163,584 and copending allowed U.S. continuation application Ser. No. 07/916,525. Applicant hereby incorporates the above-mentioned references in this application. The preferred foam dispensing gun 22 and foam dispensing system 20 are available from Polyfoam Products, Inc. of Spring, Tex.

As shown in FIG. 3, the foam dispensing system 20 includes a foam dispensing gun 22 for the mixing and dispensing of chemical reactants in forming the polyurethane foam. The foam dispensing system 20 also includes vessels 24 for separately storing the chemical reactants for the polyurethane foam and a source 32 connected to the vessels 24 for transferring the chemical reactants in the vessels 24 to the foam dispensing gun 22. As shown in FIG. 3, the source 32 is a pressurized source, typically a tank of pressurized nitrogen having regulating valves 25 mounted thereto. Alternatively, the source may consist of a pump assembly (not shown) which pumps the chemical components from the vessels 24 to the foam dispensing gun.

The chemical reactants for the polyurethane foam are a polyisocyanate designated as component A and a liquid organic resin designated as component B. Components A and B are each supplied to the dispensing gun 22 through suitable hoses or feed lines 26 and 27. Components A and B are first mixed within a detachable chamber in a cartridge assembly 42, secured to the dispensing gun 22, to form the polyurethane foam which is then discharged from the gun 22.

In operation, the vessels 24 containing components A and B are pressurized by the pressure source 32, typically a tank of pressurized nitrogen, and the regulating valves 25. The components A and B are pressurized to approximately 50–250 pounds per square inch as compared to prior foam dispensing guns requiring the components A and B to be pressurized to approximately 800–1200 pounds per square inch. Alternatively, the pressure source 32 may consist of a pump assembly (not shown) which pumps components A and B from the vessels 24 to the foam dispensing gun 22. The hoses 26, 27 from the component vessels 24 are connected to a carrier assembly 38 of the foam dispensing gun 22. The hoses 26, 27 may be either heated or unheated. A supply hose 30 connects the pressure source 32 with a pipe tee 34 of the foam dispensing gun 22. A regulating valve 33 controls the supply of compressed air or other gas from the source 32 to the foam dispensing gun 22. The compressed air supplied to the foam dispensing gun 22 is pressurized to approximately 100–250 pounds per square inch. It should be noted that the source 32 for the supply hose 30 may comprise a separate air compressor unit (not shown) to provide a more economical foam dispensing system 20.

The above-described foam dispensing system 20 is inexpensive, simple and requires little maintenance. The operating pressures of the foam components and the injected pressurized gas in the preferred foam dispensing system 20 are significantly lower than certain prior art foam dispensing systems making the preferred system less costly to operate and maintain.

The roof tiles 10 are installed in rows beginning along the lower edge of the roof. Referring to FIG. 4, a worker takes the foam dispensing gun 22 by the handle 36 and places a stream 18 of foamable liquid polyurethane 16 in a generally straight line corresponding to the approximate length of the roof tile 10 on the roof substrate 56. The stream 18 is located at the position where the first base portion 13 of the roof tile 10 will be situated on or above the roof substrate 56. Due to the interlocking connection of adjacent roof tiles 10 as shown in FIG. 4, the stream 18 is not required beneath the second base portion 15 of the roof tile 10. A second stream 18 beneath the second base portion 15 may be used to obtain an even greater bond between the roof substrate 56 and the roof tile 10, if desired.

As stated above, the roof tile 10' is placed adjacent to the previously installed roof tile 10 so that the first edge 12 of the second roof tile 10' overlaps and interlocks the second edge 14 of the first roof tile 10. The first base portion 13 of the roof tile 10 is positioned in and above the foaming stream 18 during the reactivity period of the liquid polyurethane 16.

The liquid polyurethane foam 16 is a two component foam. A two component polyurethane foam provides significant advantages over a single component polyurethane foam in this type of application. A single component polyurethane foam takes several hours to cure internally whereas a two component polyurethane foam can have a very short reactivity time and be cured within minutes. Thus, the significant advantage of the two component polyurethane foam is being able to walk on the installed roof tiles 10 shortly after the tiles 10 have been installed without affecting the bond between the roof tile 10 and roof substrate 56. The reactivity period or rise time of the two component liquid polyurethane foam 16 of the present invention is preferably about one-half to about ten minutes and most preferably about one and one-half to about four minutes. It is important that the roof tile 10 be properly placed during the reactivity period to achieve the required bonding of the roof tile 10 to the roof substrate 56. During the reactivity period, the liquid polyurethane 16 is an expanding foam which will fill gaps and imperfections. The resulting foam provides excellent bonding between the roof tile 10 and the roof substrate 56 due to the adhesive properties of the urethane. It has been found that a reactivity period of less than about one-half minute makes it difficult to timely place the roof tile 10 during the reactivity period.

The foamable liquid polyurethane 16 is preferably a froth foam. Froth foam chemistry is well known in the art of urethane foams. The froth foam may be formed by using blowing agents such as hydrogenated chloro fluoro carbon R22 (HCFC-R22), hydrogenated fluoro carbon 134A (HFC-134A), or chloro fluoro carbon R12 (CFC-R12). Preferably, the froth foam 16 is formed by using the hydrogenated blowing agents HCFC-R22 or HFC-134A and not CFC-R12 due to CFC-R12's reported deleterious effects to the earth's ozone layer.

In the preferred method, the froth foam 16 has a consistency similar to a foamy shaving cream. The froth foam is preferable over other types of foams because it can be neatly and accurately dispensed from the foam dispensing gun 22 without blowing or overspraying onto other areas of the roof substrate or onto the outer surface of adjacently installed roof tiles 10. The preferred liquid polyurethane 16 with its shaving cream consistency does not run when placed onto a steeply pitched roof, but remains where it is installed on the roof substrate 56. This ensures that the adhesive bond will be formed along the entire length of the roof tile 10. Additionally, the froth foam 16 begins expanding immediately upon application to the roof substrate 56 and results in a continuous bond along the length of the roof tile 10.

The liquid polyurethane 16 preferably has a density of about one to about eight pounds per cubic foot. It may be desirable to minimize the density of the liquid polyurethane 16 to minimize the weight on the roof while still providing an excellent bonding of the roof tile 10 to the roof substrate 56. It has been found to be most preferable to have a foam density of about one and one-half to about two pounds per cubic foot.

The application rate of the liquid polyurethane is preferably about one to about six pounds per minute and most preferably about two to about three pounds per minute.

Figure 6:
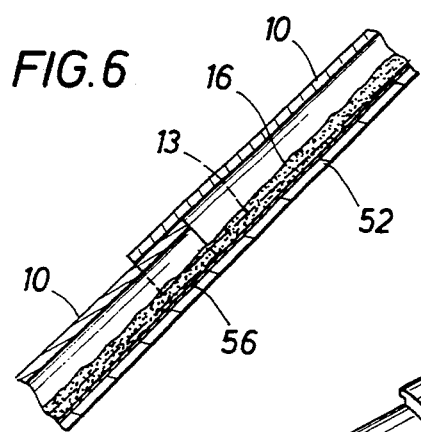
FIG. 6 is a view taken along line 6—6 of FIG. 5.
Figure 5:
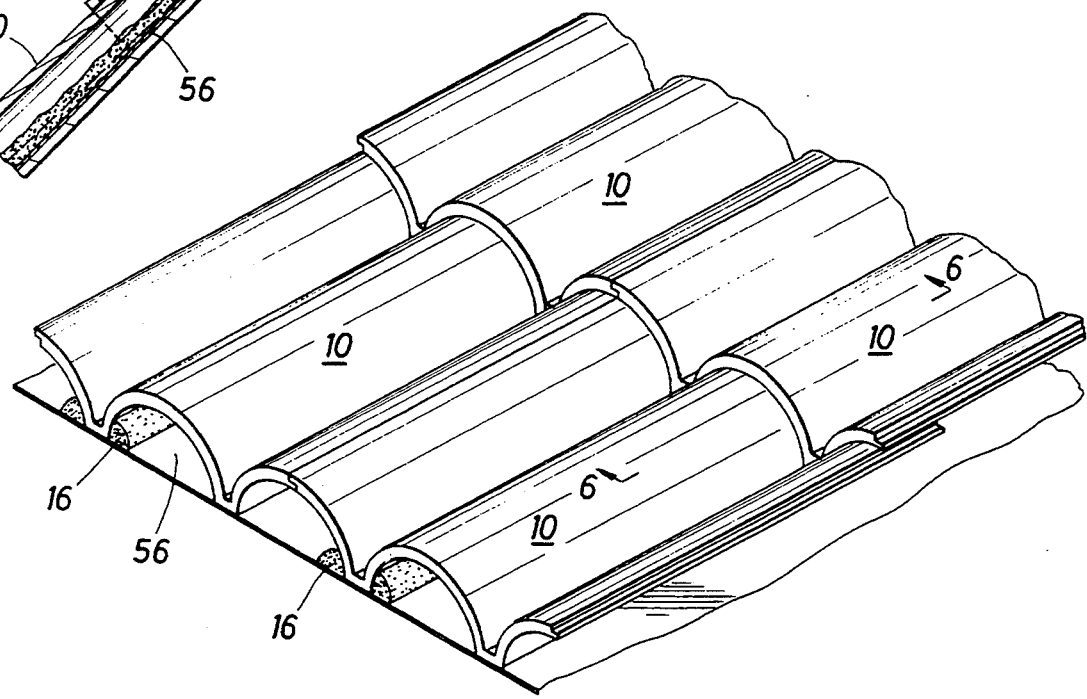
FIG. 5 is a perspective view of a portion of the pitched roof with an upper row of roof tiles overlapping the lower row of roof tiles.

Referring to FIGS. 5 and 6, a second row of roof tiles 10 is shown overlapping the lower row of roof tiles 10. As shown in FIG. 6, the first base portion 13 does not rest on the roof substrate 56 along its entire length. The first base portion 13 at the highest end of roof tile 10 comes into contact or very near contact with the roof substrate 56 but moves gradually away from the roof substrate 56 at the lowest end where it overlaps the lower roof tile 10. The foamable liquid polyurethane 16 expands and fills the gaps between the roof substrate 56 and the first base portion 13. The excess foam continues expanding and provides further bonding with adjacent surface areas of the roof tile 10 as shown in FIGS. 4, 5, and 6. A thin layer of foam may be present between the roof substrate 56 and the first base portion 13 at the highest end of the roof tile 10 depending on the placement of the stream 18.

Referring to FIG. 6, the expanding foam 16 also provides a bond between the upper tile 10 and the lower tile 10 at the overlapping portion where the expanding foam can fill any gap between the two roof tiles 10. This further enhances the overall bonding capacity of the roof tiles 10 to the roof substrate 56.

A test has been performed using the method of the present invention. The roof tiles were installed on a typical roof substrate consisting of a 90-pound bitumen saturated felt installed on a plywood deck assembly at a pitch of 4/12 (four inches rise per twelve inches along roof substrate). A liquid polyurethane having a density of about one and one-half pounds per cubic foot and a reactivity period of about four minutes, was applied at a pressure of about 150 pounds per square inch at a rate of about four pounds per minute.

Approximately two hours after installing the roof tiles 10 with the liquid polyurethane, a transverse load was applied to the roof tile 10 by drilling about a ¼ inch hole through the center of the roof tile 10 and inserting a hook in the hole. A load was hydraulically applied transversely to the roof tile 10 until there was a failure of the bond between the roof tile and the roof felt. Several tests were performed and the ultimate loads required to break the bond between the roof tile and the roof felt ranged from 240-295 pounds. The failure of the bond in the tests occurred primarily at the felt-foam interface, and not at the tile-foam interface. In some instances, it was the felt itself which failed and not the bond between the foam and the felt. For comparison purposes with tiles installed with mortar, the bond typically fails at the tile-mortar interface at a load of about 65 pounds.

The method of bonding roof tiles to the roof substrate described above is a highly efficient and economical method which does not add needless weight to the roof. The method is non-labor intensive and results in a very high bond between the roof tile and the roof substrate. The foam provides a very quick bond which can be walked on within approximately twenty minutes. Additionally, it has been found that the roof tile can be moved during the first four to five minutes while the foam is still soft without affecting the bond. It is expected that the present invention provides a bonding strength of about four times greater than that of mortar and can be installed about four times quicker than mortar. The foam can be quickly and cleanly applied with equipment which is extremely dependable and easy to operate which results in a highly cost effective and safe roof tile installation procedure.

It should be understood that the invention consists of a method of bonding roof tiles utilizing urethane foam and the invention should not be unduly limited to the foregoing set forth for illustrative purposes. Various modifications and alterations of the invention will be apparent to those skilled in the art without departing from the true scope of the invention.

What is claimed is:

1. A method of installing a plurality of roof tiles to a roof substrate on a pitched roof, the method comprising the steps of:

applying a stream of a two component froth liquid polyurethane foam on the roof substrate from a hand-held foam dispensing apparatus, said stream having a length approximating the length of the roof tile and a width substantially less than the width of the roof tile, said froth liquid polyurethane foam having a density of about one to about four pounds per cubic foot and a reactivity period of about one to about six minutes;

placing a portion of a lower surface of a first roof tile in substantial contact with the stream of froth liquid polyurethane foam during the reactivity period; and allowing said froth liquid polyurethane foam to bond the first roof tile to the roof substrate, wherein only a portion of the lower surface of the first roof tile is in contact with the polyurethane foam.

2. The method of installing according to claim 1, wherein said froth liquid polyurethane foam is applied on the roof substrate under a pressure of less than about 300 pounds per square inch.

3. The method of installing according to claim 2, wherein said froth liquid polyurethane foam is applied on the roof substrate under a pressure of about 50 to about 250 pounds per square inch.

4. The method of installing according to claim 2, wherein said froth liquid polyurethane foam is applied at a rate of about two to about three pounds per minute.

5. The method of installing according to claim 1, wherein said step of applying a stream of a two component froth liquid polyurethane foam comprises the steps of:
    introducing each of the two liquid polyurethane foam components into a chamber of a foam dispensing apparatus;
    mixing the two liquid polyurethane foam components in the chamber to form a foam;
    introducing pressurized gas at a location downstream of the introduction of the liquid polyurethane components into the chamber and while the foam components are introduced into the chamber to provide additional mixing of the foam; and
    dispensing a foam stream from the foam dispensing apparatus.

6. The method of installing according to claim 1, wherein said step of placing the first roof tile in substantial contact with the froth liquid polyurethane foam comprises contacting substantially the entire length of the first roof tile with the stream of froth liquid polyurethane foam.

7. The method of installing according to claim 1, further comprising the steps of:
    applying a second stream of the two component froth liquid polyurethane foam on the roof substrate at a location substantially above the first installed roof tile;
    placing a portion of a lower surface of a second roof tile in substantial contact with the second stream of froth liquid polyurethane foam during the reactivity period, the second roof tile having a lower end overlapping a portion of the first roof tile; and
    allowing said froth liquid polyurethane foam to bond the second roof tile to the roof substrate and to the first roof tile,
    wherein only a portion of the lower surface of the second roof tile is in contact with the polyurethane foam.

8. The method of installing according to claim 1, wherein said froth liquid polyurethane foam has a shaving cream consistency.

9. A method for in situ installation of a plurality of individual interlocking roof tiles to a roof substrate, the method comprising the steps of:
    directing a first stream of a plural component foamable liquid polyurethane on the roof substrate;
    placing a first roof tile in contact with said first stream of foamable liquid polyurethane during the reactivity period of the foamable liquid polyurethane;
    directing a second stream of the plural component foamable liquid polyurethane on the roof substrate at a proximate location but separated from said first stream;
    placing a second roof tile in contact with said second stream of foamable liquid polyurethane during the reactivity period of the foamable liquid polyurethane; and
    interlocking the second roof tile with the first roof tile.

10. The method according to claim 9, wherein said first and second streams are elongated having a length approximating the length of the roof tile and a width substantially less than the width of the roof tile.

11. The method according to claim 9, wherein each of the first and second roof tiles have a lower surface and each lower surface is only partially in contact with the foamable liquid polyurethane.

12. The method according to claim 9, wherein said first and second streams are directed to specific locations on the roof substrate which are to receive the first and second roof tiles, respectively.

13. The method according to claim 9, wherein said streams of the plural component foamable liquid polyurethane are directed on the roof substrate from a handheld foam dispensing gun.

14. A method for in situ installation of a plurality of rows of individual interlocking roof tiles to a roof substrate on a pitched roof, the method comprising the steps of:
    depositing a first stream of a plural component foamable liquid polyurethane on the roof substrate, said first stream being deposited in a generally straight line and having a length approximating the length of the roof tile and a width substantially less than the width of the roof tile;
    placing a lower surface of a first roof tile in contact with said first stream of foamable liquid polyurethane during the reactivity period of the foamable liquid polyurethane;
    allowing said plural component foamable liquid polyurethane to expand and adhesively bond to a roof tile lower surface portion which is substantially less than the entire roof tile lower surface area;
    depositing a second stream of the plural component foamable liquid polyurethane on the roof substrate, said second stream being deposited in a generally straight line at a location proximate to but separated from said first stream, said second stream having a length approximating the length of the roof tile and a width substantially less than the width of the roof tile;
    interlocking the second roof tile with the first roof tile;
    placing a lower surface of a second roof tile in contact with said second stream of foamable liquid polyurethane during the reactivity period of the foamable liquid polyurethane; and
    allowing said plural component foamable liquid polyurethane to expand and adhesively bond to a second roof tile lower surface portion which is substantially less than the entire second roof tile lower surface area.

15. The method according to claim 14, wherein said first and second streams of expanding foam remain isolated from one another.

16. The method according to claim 15, further comprising the steps of:
    depositing a third stream of a plural component foamable liquid polyurethane on the roof substrate at a location further up the pitch of the roof and substantially aligned with said first stream, said third stream having a length approximating the length of the roof tile and a width substantially less than the width of the roof tile;

placing a lower surface of a third roof tile in contact with said third stream during the reactivity period of the foamable liquid polyurethane;

positioning a bottom end of the third roof tile to overlap onto the first roof tile; and allowing said plural component foamable liquid polyurethane to expand and adhesively bond to a third roof tile lower surface portion which is substantially less than the entire third roof tile lower surface area, wherein said expanding foam of said third stream provides bonds between the third roof tile and the roof substrate and also between the third roof tile and the lower first roof tile at the overlapping portion.

* * * * *